(12) United States Patent
Hol et al.

(10) Patent No.: US 7,161,267 B2
(45) Date of Patent: Jan. 9, 2007

(54) DISPLACEMENT APPARATUS, LITOGRAPHIC APPARATUS, DEVICE MANUFACTURING METHOD, AND DEVICE MANUFACTURED THEREBY

(75) Inventors: Sven Antoin Johan Hol, Eindhoven (NL); Johan Cornelis Compter, Eindhoven (NL); Erik Roelof Loopstra, Heeze (NL); Patricia Vreugdewater, Eindhoven (NL)

(73) Assignee: ASML Netherlands B.V., Veldhoven (NL)

( * ) Notice: Subject to any disclaimer, the term of this patent is extended or adjusted under 35 U.S.C. 154(b) by 433 days.

(21) Appl. No.: 10/855,962

(22) Filed: May 28, 2004

(65) Prior Publication Data
US 2005/0061626 A1    Mar. 24, 2005

(30) Foreign Application Priority Data
May 28, 2003    (EP)    ................................. 03076645

(51) Int. Cl.
H02K 41/025 (2006.01)
H02N 15/02 (2006.01)
G03F 7/20 (2006.01)

(52) U.S. Cl. ........................ 310/12; 414/935; 355/72; 355/53

(58) Field of Classification Search .................. 310/12
See application file for complete search history.

(56) References Cited

U.S. PATENT DOCUMENTS 5,309,049 A *  5/1994  Kawada et al. ............... 310/12
5,334,892 A *  8/1994  Chitayat ....................... 310/12
6,175,169 B1 * 1/2001  Hollis et al. .................. 310/12

FOREIGN PATENT DOCUMENTS

| EP | 0 480 547 A1 | 4/1992 |
| EP | 0 480 549 A1 | 4/1992 |
| EP | 1 215 805 A2 | 6/2002 |

OTHER PUBLICATIONS

H. Hayashiya, et al., "A Novel Combined Lift and Propulsion System for a Steel Plate Conveyance by Electromagnets," vol. 34 (No. 4), p. 2093-2095, (Jul. 1998).
H. Hayashiya, et al., "A Combined Lift and Propulsion System of a Steel Plate by Transverse Flux Linear Induction Motors," vol. 35 (No. 5), p. 4019-4021, (Sep. 1999).
European Search Report completed Nov. 10, 2003.

* cited by examiner

*Primary Examiner*—Burton Mullins
(74) *Attorney, Agent, or Firm*—Pillsbury Winthrop Shaw Pittman LLP (57) ABSTRACT

A displacement apparatus comprising a first part and a second part, which can be displaced relative to each other in first and second different directions. The apparatus being suitable for use in a lithographic apparatus for positioning the mask holder with respect to the projection beam and for positioning the wafer substrate table with respect to the patterned beam. The first part comprises a first and second coil system in which an alternating current is provided by a power supply. The second part comprises a conductive platen which is disposed in a zone in which a magnetic field is induced when power is supplied to the coil systems. The coil system and platen are arranged with respect to each other so that when currents are passed through the coils, a magnetic field induced in the platen causes displacement between the platen and the coils in the first and second different directions.

15 Claims, 5 Drawing Sheets

DISPLACEMENT APPARATUS, LITOGRAPHIC APPARATUS, DEVICE MANUFACTURING METHOD, AND DEVICE MANUFACTURED THEREBY

BACKGROUND OF THE INVENTION

1. Priority Information

This application claims priority from European Patent Application No. 03076645.5, filed May 28, 2003, herein incorporated by reference in its entirety.

2. Field of the Invention

The present invention relates to a displacement apparatus, a related lithographic apparatus, a device manufacturing method and a device manufactured thereby.

3. Description of the Related Art

Lithographic apparatus can be used, for example, in the manufacture of integrated circuits (ICs). In such a case, a patterning device may be used to generate a desired circuit pattern corresponding to an individual layer of the IC, and this pattern can be imaged onto a target portion (e.g. comprising one or more dies) on a substrate (silicon wafer) that has been coated with a layer of radiation-sensitive material (resist).

In general, a single wafer will contain a whole network of adjacent target portions that are successively irradiated via the projection system, one at a time. In current apparatus, employing patterning by a mask on a mask table, a distinction can be made between two different types of machine. In one type of lithographic projection apparatus, each target portion is irradiated by exposing the entire mask pattern onto the target portion in one go; such an apparatus is commonly referred to as a wafer stepper or step-and-repeat apparatus.

In an alternative apparatus—commonly referred to as a step-and-scan apparatus—each target portion is irradiated by progressively scanning the mask pattern under the projection beam in a given reference direction (the "scanning" direction) while synchronously scanning the substrate table parallel or anti-parallel to this direction; since, in general, the projection system will have a magnification factor M (generally<1), the speed V at which the substrate table is scanned will be a factor M times that at which the mask table is scanned. More information with regard to lithographic devices as here described can be gleaned, for example, from U.S. Pat. No. 6,046,792, incorporated herein by reference.

The term "patterning device" as here employed should be broadly interpreted as referring to a device that can be used to impart an incoming radiation beam with a patterned cross-section, corresponding to a pattern that is to be created in a target portion of the substrate; the term "light valve" can also be used in this context. Generally, the pattern will correspond to a particular functional layer in a device being created in the target portion, such as an integrated circuit or other device (see below). Examples of such patterning devices include:

- a mask: the concept of a mask is well known in lithography, and it includes mask types such as binary, alternating phase-shift, and attenuated phase-shift, as well as various hybrid mask types. Placement of such a mask in the radiation beam causes selective transmission (in the case of a transmission mask) or reflection (in the case of a reflective mask) of the radiation impinging on the mask, according to the pattern on the mask. In the case of a mask, the support structure will generally be a mask table/holder, which ensures that the mask can be held at a desired position in the incoming radiation beam, and that it can be moved relative to the beam if so desired;

- a programmable mirror array: one example of such a device is a matrix-addressable surface having a visco-elastic control layer and a reflective surface. The basic principle behind such an apparatus is that (for example) addressed areas of the reflective surface reflect incident light as diffracted light, whereas unaddressed areas reflect incident light as non-diffracted light. Using an appropriate filter, the non-diffracted light can be filtered out of the reflected beam, leaving only the diffracted light behind; in this manner, the beam becomes patterned according to the addressing pattern of the matrix-addressable surface. An alternative embodiment of a programmable mirror array employs a matrix arrangement of tiny mirrors, each of which can be individually tilted about an axis by applying a suitable localized electric field, or by employing piezoelectric actuation mechanism. Once again, the mirrors are matrix-addressable, such that addressed mirrors will reflect an incoming radiation beam in a different direction to unaddressed mirrors; in this manner, the reflected beam is patterned according to the addressing pattern of the matrix-addressable mirrors. The required matrix addressing can be performed using suitable electronic means. In both of the situations described here above, the patterning device can comprise one or more programmable mirror arrays. More information on mirror arrays as here referred to can be gleaned, for example, from U.S. Pat. Nos. 5,296,891 and 5,523,193, and PCT patent applications WO 98/38597 and WO 98/33096, which are incorporated herein by reference. In the case of a programmable mirror array, the support structure may be embodied as a frame or table, for example, which may be fixed or movable as required; and

- a programmable LCD array: an example of such a construction is given in U.S. Pat. No. 5,229,872, which is incorporated herein by reference. As above, the support structure in this case may be embodied as a frame or table, for example, which may be fixed or movable as required.

For purposes of simplicity, the rest of this text may, at certain locations, specifically direct itself to examples involving a mask and mask table/holder; however, the general principles discussed in such instances should be seen in the broader context of the patterning device as set forth here above.

In manufacturing processes that employ a lithographic projection apparatus, a pattern (e.g. in a mask) is imaged onto a substrate that is at least partially covered by a layer of radiation-sensitive material (resist). Prior to this imaging step, the substrate may undergo various procedures, such as priming, resist coating and a soft bake. After exposure, the substrate may be subjected to other procedures, such as a post-exposure bake (PEB), development, a hard bake and measurement/inspection of the imaged features. This array of procedures is used as a basis to pattern an individual layer of a device, e.g. an IC. Such a patterned layer may then undergo various processes such as etching, ion-implantation (doping), metallization, oxidation, chemo-mechanical polishing, etc., all intended to finish off an individual layer. If several layers are required, then the whole procedure, or a variant thereof, will have to be repeated for each new layer.

Eventually, an array of devices will be present on the substrate (wafer). These devices are then separated from one another by a technique such as dicing or sawing, whence the individual devices can be mounted on a carrier, connected to pins, etc. Further information regarding such processes can be obtained, for example, from the book "Microchip Fabrication: A Practical Guide to Semiconductor Processing", Third Edition, by Peter van Zant, McGraw Hill Publishing Co., 1997, ISBN 0-07-067250-4, incorporated herein by reference.

For the sake of simplicity, the projection system may hereinafter be referred to as the "lens"; however, this term should be broadly interpreted as encompassing various types of projection system, including refractive optics, reflective optics, and catadioptric systems, for example. The radiation system may also include components operating according to any of these design types for directing, shaping or controlling the projection beam of radiation, and such components may also be referred to below, collectively or singularly, as a "lens".

Further, the lithographic apparatus may be of a type having two or more substrate tables (and/or two or more mask tables). In such "multiple stage" devices the additional tables may be used in parallel, or preparatory steps may be carried out on one or more tables while one or more other tables are being used for exposures. Dual stage lithographic apparatus are described, for example, in U.S. Pat. No. 5,969,441 and WO 98/40791, both incorporated herein by reference.

It will be appreciated that displacement apparatuses, comprising a first and a second part which can be displaced with respect to each other with six degrees of freedom are known. The displacements may include movements along a first, second, and third different directions and rotations corresponding to each direction. Such an apparatus may be used, inter alia, in a wafer stepper for manufacturing integrated circuits. The first part comprises a platen extending in the x-y plane and on which a system of permanent magnets is secured in a particular arrangement. The second part comprises an electric coil system, wherein the electric coils are arranged in a particular way extending substantially in the x-y plane.

The second part is displaced from the first part in the z direction and disposed in a particular relationship with respect to it in the x-y plane. When electric currents pass through the coils, by virtue of the interaction between the magnetic field generated by the current passing through the coil with respect to the magnetic field of the permanent magnets disposed on the platen, a force between the first part and the second part is generated. The generated force depends upon the amplitude or amount of the current through the coils, shape of the coils the strength, type and shape of the permanent magnets, and the spatial arrangement of the magnets with respect to the coils. The second part is coupled to an x-y stage, which may for example be the wafer stage of a lithographic apparatus. In this way, the wafer stage can be moved into position in order to receive the projection beam.

Such apparatuses may be referred to as synchronous planar motors. The apparatuses may be referred to as "motors," because the motion causes the stage to be driven to a predetermined position. The apparatuses are referred to as "synchronous," because the magnetic field generated by the coils is arranged to be synchronous with the field of the permanent magnets. The apparatuses are also referred to as "planar," because they provide movement in two directions, that is, along a plane.

Certain stages in manufacturing processes require movement in one direction. For example, in a lithographic apparatus, the reticle stage is moved substantially parallel to the y direction. Other stages substantially move in two coordinate directions. For example, in a lithographic apparatus, the wafer stage is moved substantially in the x and y directions. Conventional solutions using linear motors require a stack of linear motors arranged in an H- or T-shaped construction in order to provide movement in a plane. One problem with using a stack of linear motors combined with an air bearing is that the stack cannot be used in a vacuum, which is necessary for extreme ultra violet (EUV) or electron bundle imaging. In addition, planar motors are generally lighter than an H construction. Because there is less moving mass, higher accelerations can be obtained for a certain force.

SUMMARY OF THE INVENTION

Synchronous planar motors, as discussed above and as described in described in WO 01/18944, for example, tend to be very expensive. The cost of the magnets required for the second part is very high. Moreover, the magnet array requires careful and costly alignment in order to generate the displacements having the required accuracy. To this end, Hall sensors are used and accurate position measurement is always required.

Also, in conventional planar motors, the rotation in the θz is limited because planar motors having a magnet plate require alignment of the magnets in the magnet plate with the coils. Furthermore, positioning systems often comprise a long stroke motor, which carries out rough positioning and a short stroke motor, which carries out accurate positioning. In positioning systems for lithographic apparatuses, the long stroke motor positions with an accuracy of +/−1 micrometer, whereas the short stroke motor carries out the accurate alignment of +/−1 nanometers. The prior art synchronous planar motors described above, are conventionally used as long stroke motors.

The inventors of the present invention have identified that the apparatus described in WO 01/18944 and other conventional apparatus suffer from the further problem that the magnets in the long stroke motor cause undesirable cross talk from the long stroke motor to the short stroke motors.

A further problem with conventional motors is that not all conventional motors are suitable for use in contemporary lithographic apparatus. Integrated circuits comprise a very large number of components provided on a small area of substrate. In order to fit as many components as possible onto the substrate, demand for smaller feature sizes has increased. The minimum size of a feature written by a projection beam is determined by the wavelength of the projection beam. Thus, contemporary projection beams as well as comprising deep ultra violet light, may also comprise extreme ultra violet light (EUV), electron beam and ion beam projection. In contrast to other projection beams EUV, electron beam and ion beam projection must be carried out in a vacuum. The inventors of the present invention have discovered that several of the conventional wafer positioning apparatuses are not suitable for use in a vacuum. For example, motors having air bearings or ball bearings are not suitable for use in a vacuum without taking special precautions, such as those required to construct, for example, differential air bearings.

For at least one of the drawbacks articulated above, the principles of the present invention, as embodied and broadly described herein, provide for a displacement apparatus capable of displacing first and second parts with respect to each other along six degrees of freedom, without at least one drawback as identified above with respect to conventional apparatuses.

In one embodiment, a displacement apparatus is presented, which comprises a first part comprising a first coil system that includes a first plurality of windings having a longitudinal axis extending along a first direction and a second coil system that includes a second plurality of windings having a longitudinal axis extending along a second direction, wherein the first and second directions lie in a plane and the first and second plurality of windings configured to respectively carry a current; a second part comprising a conductive platen disposed in a vicinity of the first part in a zone in which the first and second coils induce a magnetic field in the platen based on the currents carried by the first and second plurality of windings; and an alternating current supply configured to supply a multi-phase alternating current to the first and second coil systems. With this configuration, a phase difference between the magnetic field of the first and second plurality of windings and the magnetic field induced in the platen subjects the first and second parts to a force resulting in the first and second parts being displaceable relative to one another along the second and first directions, respectively, and in a third direction that is at an angle to the plane.

This apparatus provides the advantages that the expensive and heavy magnet array necessary in prior art devices can be dispensed with. Instead, an electrically conducting platen is used. By applying appropriate currents in the electric coil system of the second part, magnetic fields are induced in the conductive platen. These magnetic fields interact with the currents in the electric coil system and provide a force between first and second parts of the displacement apparatus. By controlling at least either the amplitude or the frequency or the phase, or a combination thereof, of the currents in the electric coil system, control of displacement in six degrees of freedom is achieved.

The apparatus of the present invention has the added benefit over prior art devices in that magnetic cross talk is suppressed between the long and the short stroke motors. The apparatus is capable of functioning in a vacuum. The present invention provides the additional advantage that the motion in the θz direction is unlimited, in contrast to conventional motors, because the present invention does not require coil alignment with a magnet plate. It is commented, that for further improved control relative speed or position information is required. The motor of the present invention provides rotation over any angle θz, while providing movement in any direction in the x-y plane.

In one embodiment, the platen comprises copper or stainless steel or aluminum or titanium. It has been found that these materials provide an optimum environment in which magnetic fields can be induced, so as to result in accurate displacement.

In a further preferred embodiment, control mechanism is provided for controlling the displacement of the first and second parts with respect to one another the control mechanism for controlling the alternating current supplied to the first and second coil systems. It has been found that controlling the alternating current supplied to the first and second coil systems allows accurate control of the displacement apparatus by vector control.

In further embodiments, the frequency, amplitude or phase of the currents supplied to the coils systems is controlled, respectively. It has been found that these parameters in particular, allow accurate generation of required forces to be achieved.

According to a further aspect of the invention there is provided a device manufacturing method comprising providing a substrate that is at least partially covered by a layer of radiation-sensitive material; conditioning a beam of radiation using an illumination system; providing a support configured to support a patterning device; configuring the beam of radiation with a desired pattern in its cross-section based on the patterning device; projecting the patterned beam of radiation onto a target area of the layer of radiation-sensitive material; and providing a displacement apparatus configured to displace the substrate with respect to the patterned beam.

The displacement is achieved by providing a first coil system that includes a first plurality of windings having a longitudinal axis extending in a first direction, the first plurality of windings configured to carry a current; providing a second coil system that includes a second plurality of windings having a longitudinal axis extending in a second direction, the second plurality of windings configured to carry a current and wherein the first and second directions lie in a plane; providing the second part with a conductive platen; positioning the platen in a vicinity of the first part in a zone in which the first and second coils induce a magnetic field in the platen based on the currents carried by the first and second plurality of windings; supplying a multi-phase alternating current to the first and second coil systems, wherein a phase difference between the magnetic field of the first and second plurality of windings and the magnetic field induced in the platen subjects the first and second parts to a force relative to each other along the second and first directions, respectively, and in a third direction that is at an angle to the plane; and coupling the displacement apparatus to the substrate.

Although specific reference may be made in this text to the use of the apparatus according to the invention in the manufacture of ICs, it should be explicitly understood that such an apparatus has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as being replaced by the more general terms "mask", "substrate" and "target portion", respectively.

In the present document, the terms "radiation" and "beam" are used to encompass all types of electromagnetic radiation, including ultraviolet (UV) radiation (e.g. with a wavelength of 365, 248, 193, 157 or 126 nm) and extreme ultra-violet (EUV) radiation (e.g. having a wavelength in the range 5–20 nm), as well as particle beams, such as ion beams or electron beams.

BRIEF DESCRIPTION OF DRAWINGS

Embodiments of the invention will now be described, by way of example only, with reference to the accompanying schematic drawings, in which.

DETAILED DESCRIPTION OF THE INVENTION

Lithographic Apparatus

Figure 1:
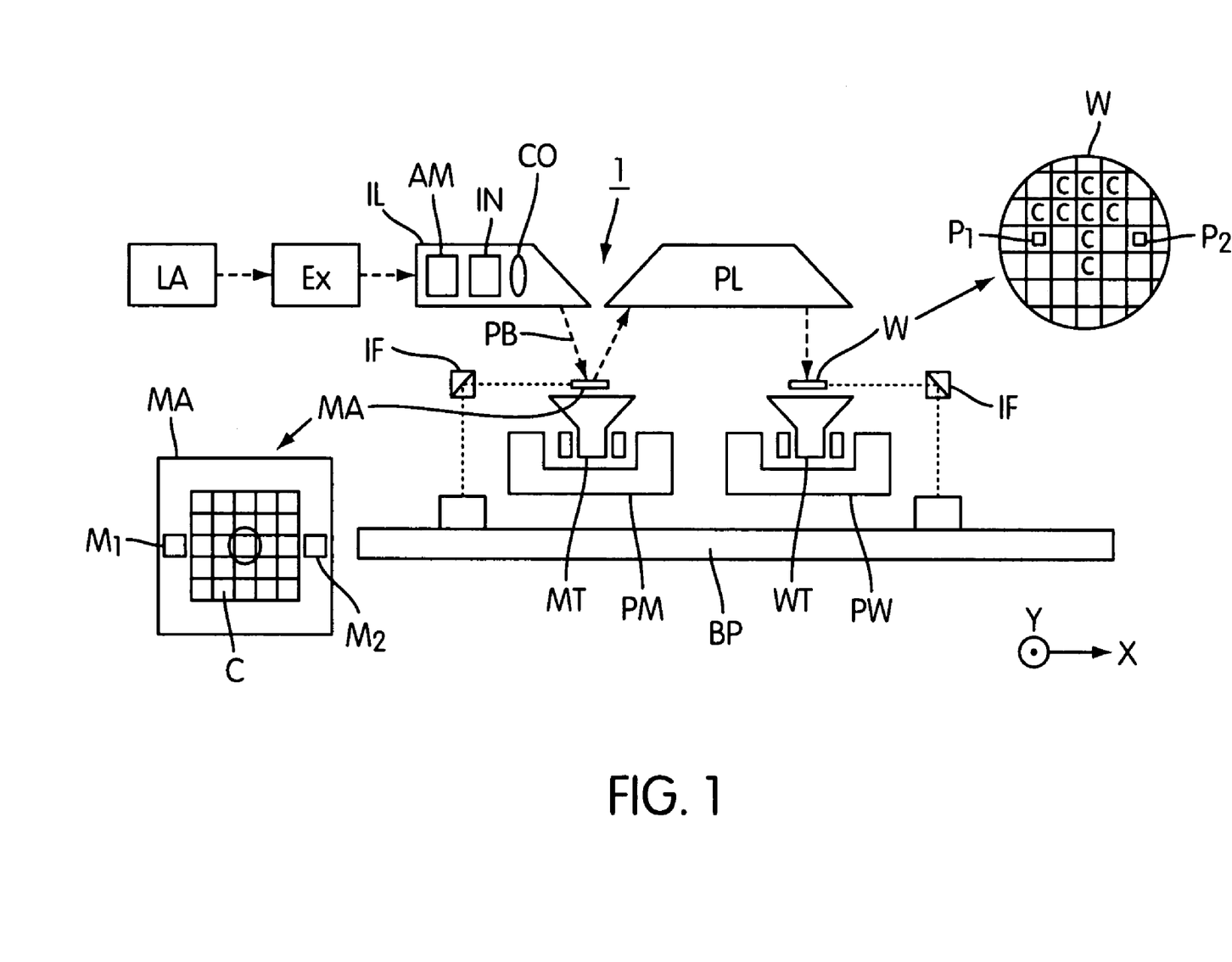
FIG. 1 depicts a lithographic projection apparatus according to an embodiment of the present invention.

Although the displacement apparatus of the present invention is not only limited to lithographic applications, for purposes of illustration, when appropriate, the displacement apparatus will be described with respect to lithographic apparatus components. As such, FIG. 1 schematically depicts a lithographic apparatus 1, according to an embodiment of the invention. The lithographic apparatus comprises:

- an illumination system Ex, IL: for supplying a projection beam PB of radiation (e.g. EUV, DUV, or UV radiation). In this particular case, the radiation system also comprises a radiation source LA;
- a first object table (mask table/holder/holder) MT: provided with a mask holder for holding a mask MA (e.g. a reticle), and connected to first positioning mechanism for accurately positioning the mask with respect to item PL;
- a second object table (substrate table/holder) WT: provided with a substrate holder for holding a substrate W (e.g. a resist-coated silicon wafer), and connected to second positioning mechanism for accurately positioning the substrate with respect to item PL;
- a projection system ("lens") PL: for example, a mirror or refractive lens system that images an irradiated portion of the mask MA onto a target portion C (comprising one or more dies) of the substrate W.

The displacement apparatus (not shown in FIG. 1) of the present invention may be incorporated in the embodiment shown in FIG. 1 in the first and/or second positioning mechanism, PM, PW, respectively. In the embodiment shown in FIG. 1, the displacement apparatus D (not shown in FIG. 1) of the present invention may be used to accurately position the mask and/or the wafer with respect to item PL.

As here depicted, the apparatus 1 is of a reflective type (i.e. has a reflective mask). However, in general, it may also be of a transmissive type, for example (with a transmissive mask). Alternatively, the apparatus may employ another kind of patterning devices, such as a programmable mirror array of a type as referred to above.

The source LA (e.g. a mercury lamp, a Krypton Fluoride excimer laser or a plasma source) produces a beam of radiation. This beam is fed into an illumination system (illuminator) IL, either directly or after having traversed conditioning means, such as a beam expander Ex, for example. The illuminator IL may comprise adjusting means AM for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam PB impinging on the mask MA has a desired uniformity and intensity distribution in its cross-section.

It should be noted with regard to FIG. 1 that the source LA may be within the housing of the lithographic projection apparatus (as is often the case when the source LA is a mercury lamp, for example), but that it may also be remote from the lithographic projection apparatus, the radiation beam which it produces being led into the apparatus (e.g. with the aid of suitable directing mirrors); this latter scenario is often the case when the source LA is an excimer laser. The current invention and claims encompass both of these scenarios.

The beam PB subsequently intercepts the mask MA, which is held on a mask table MT. Having traversed the mask MA, the beam PB passes through the lens PL, which focuses the beam PB onto a target portion C of the substrate W. With the aid of the second positioning mechanism PW incorporating the displacement apparatus of the present invention (and interferometric measuring means IF), the substrate table WT can be moved accurately, e.g. so as to position different target portions C in the path of the beam PB.

Similarly, the first positioning mechanism PM can be used to accurately position the mask MA with respect to the path of the beam PB, e.g. after mechanical retrieval of the mask MA from a mask library, or during a scan. In general, movement of the object tables MT, WT will be realized with the aid of a long-stroke module and a short-stroke module, which are not explicitly depicted in FIG. 1. However, in the case of a wafer stepper (as opposed to a step-and-scan apparatus) the mask table MT may just be connected to a short stroke actuator, or may be fixed. Mask MA and substrate W may be aligned using mask alignment marks M1, M2 and substrate alignment marks P1, P2.

The apparatuses depicted in FIG. 1 can be used in different modes, such as:

- step mode: the mask table MT is kept essentially stationary, and an entire mask image is projected in one go (i.e. a single "flash") onto a target portion C. The substrate table WT is then shifted in the X and/or Y directions so that a different target portion C can be irradiated by the beam PB;
- scan mode: essentially the same scenario applies, except that a given target portion C is not exposed in a single "flash". Instead, the mask table MT is movable in a given direction (the so-called "scan direction", e.g. the Y-direction) with a speed v, so that the projection beam PB is caused to scan over a mask image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution; and
- other mode: the mask table MT is kept essentially stationary holding a programmable patterning device, and the substrate table WT is moved or scanned while a pattern imparted to the projection beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Theoretical Background

Before the further preferred embodiments are described in detail, the theoretical background of the present invention will be described with reference to FIG. 2.

Figure 2:
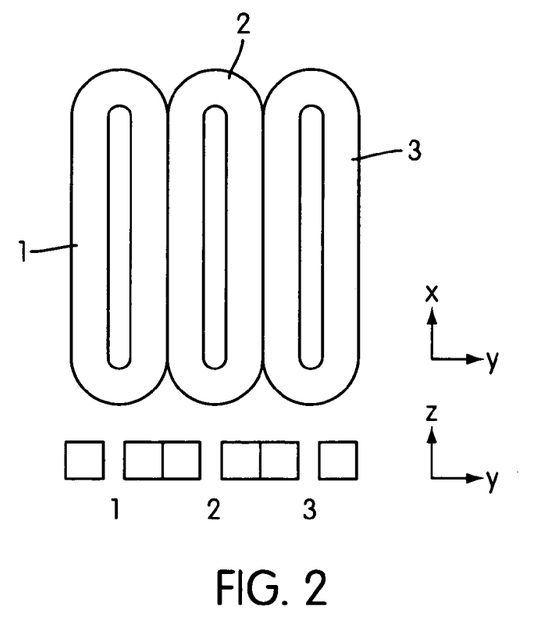
FIG. 2 depicts a coil system in accordance with the displacement apparatus of the present invention.
Figure 6:
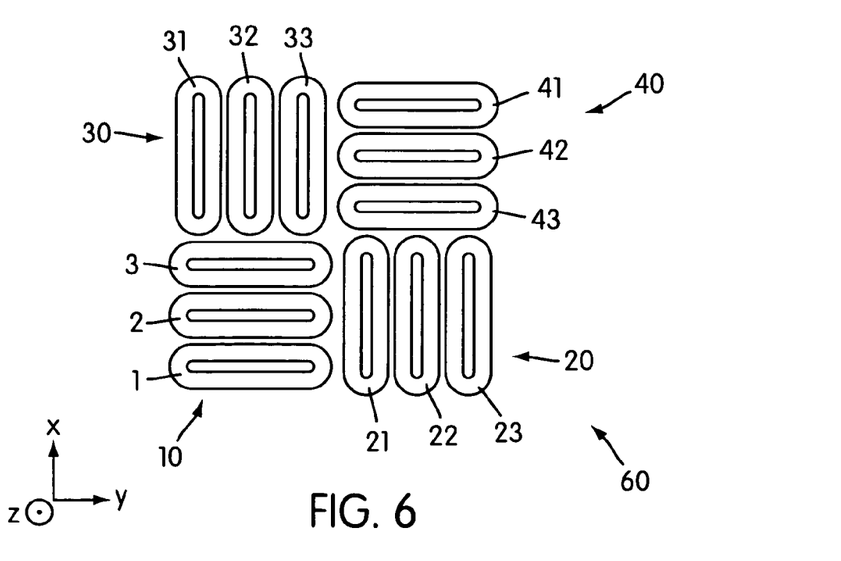
FIG. 6 depicts a mover comprising four forcers each comprising a three phase coil system in the x-y plane.
Figure 7:
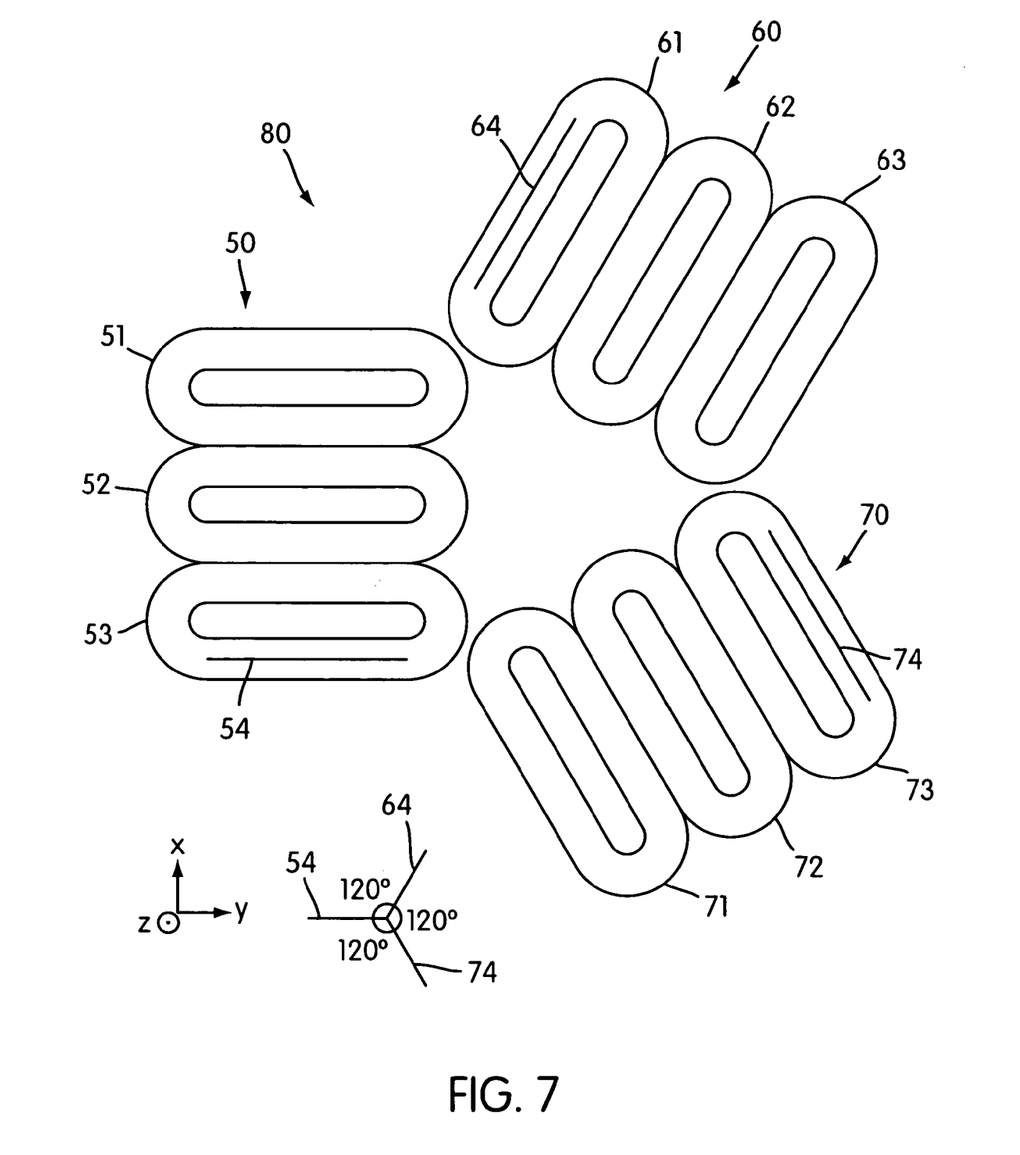
FIG. 7 depicts a mover comprising three forcers each comprising a three phase coil system in the x-y plane.

In the discussion below, the expression a "three phase coil system" or a "three phase forcer", refers to a coil system 1, 2, 3 comprising a one dimensional array of three windings preferably arranged adjacent to one another having a longitudinal axis extending in the same direction as each other, as shown in FIG. 2. It will be appreciated, however, that the invention is not limited in this respect. The present invention has application in coil systems having any number of windings larger or equal to 2. The windings also be overlapping to a certain degree. If a two-phase system is used, the phase difference between phases is 90 degrees instead of 120 degrees for a three phase system. The minimum number of windings per system is two. The minimum number of coil systems is three. For example, FIG. 6 shows four coil systems, also referred to as "forcers", each coil system comprising three windings. However, the invention also functions if instead of four forcers, three are provided, as is shown in FIG. 7.

A three-phase coil system 1, 2, 3 as shown in FIG. 2 is considered. A three-phase alternating current is applied to the windings as described by eq. (1):

$$i1 = I \cdot \sin(\omega \cdot t) \qquad (1)$$
$$i2 = I \cdot \sin\left(\omega \cdot t + \frac{2\pi}{3}\right)$$
$$i3 = I \cdot \sin\left(\omega \cdot t + \frac{4\pi}{3}\right)$$

in which i1, i2, i3 is the current in winding 1, 2 and 3, respectively, I is the amplitude of the currents through the windings and ω the angular frequency of the currents.

This current configuration i1, i2, i3 can also be described as a travelling current wave:

$$i(x, t) = I \sin\left(\omega \cdot t + \frac{2\pi \cdot x}{d}\right) \qquad (2)$$

where d is the horizontal dimension of the 3 phase coil system.

Figure 4:
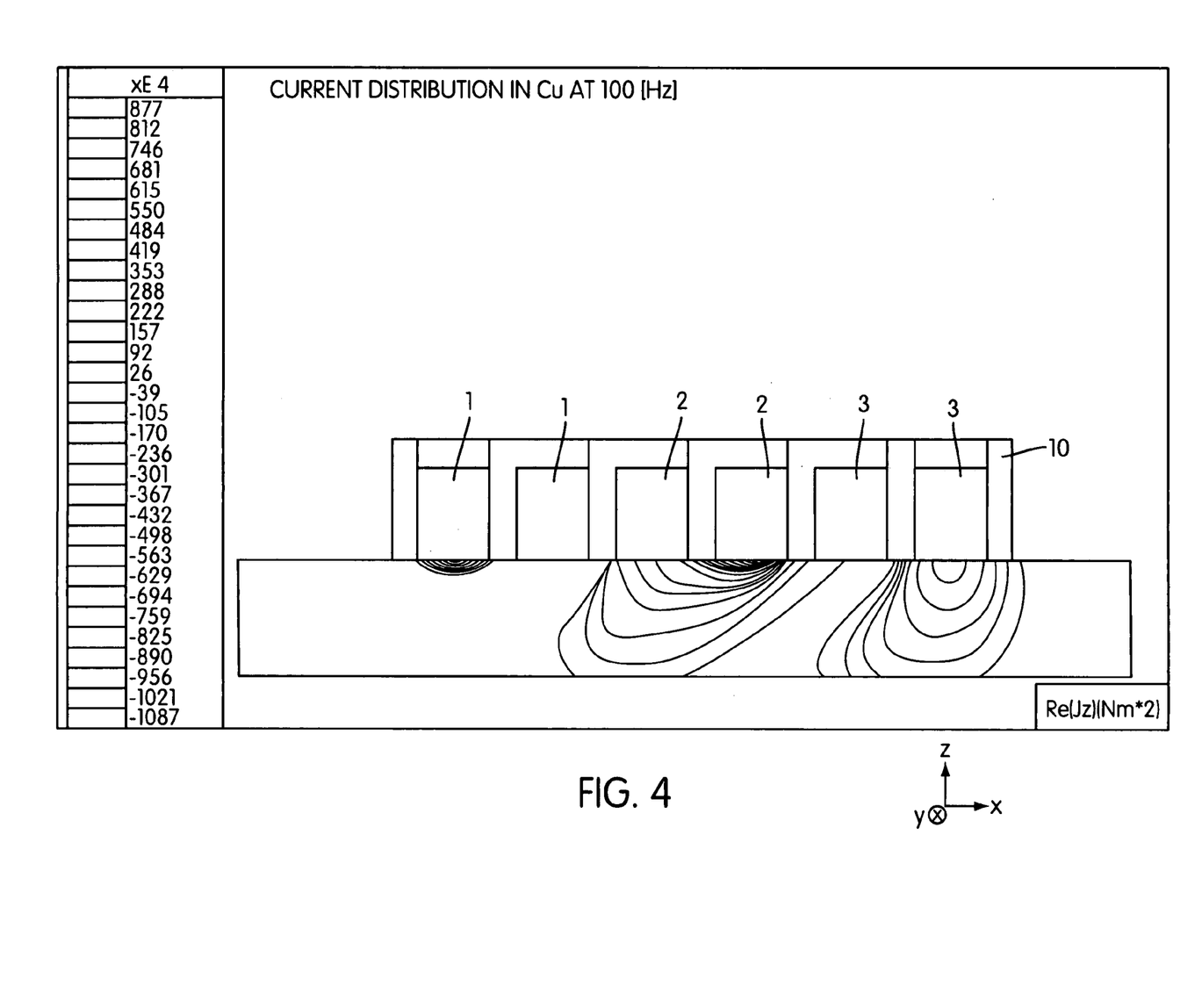
FIG. 4 depicts the current distribution in a copper platen which is induced by the coil system shown in FIG. 3 operating a frequency of 100 Hertz.

As depicted in FIG. 4, when a platen 7, comprising electrically conductive material, is placed close to the current carrying windings 1, 2, 3, the time-varying magnetic field associated with the travelling current wave will induce and electric field E in the platen. The induced E-field results in a current distribution in the material, which has a phase shift with respect to the current in, and magnetic field due to, the windings. Furthermore, a force is generated between the coil system and the conductive platen 7 due to the interaction of the induced current distribution and the magnetic field of the coil system.

A multiphase coil system, preferably a three-phase system, is used, so that the force acting between platen 7 and coil system 1, 2, 3 is time independent. Furthermore, a multiphase coil system generates a spatial displacement between the current distribution in the coil system 1, 2, 3 and the current distribution induced in the platen 7. As a result, the force acting between coil system 1, 2, 3 and platen 7 has both a component in a vertical direction (repelling force) and a component in horizontal direction. This spatial displacement between both current distributions depends on the material properties of the platen and on the applied frequency of the currents in the coil system.

Therefore, by altering the frequency of the current in the coil system, the ratio of vertical force component over horizontal force component is altered. Furthermore, by altering the amplitude of the currents supplied to the coil system, the amplitude of generated force can be altered. Further, with the phase angle the dynamics of the motor can be controlled, as proven by vector control.

Having described the theoretical background to the present invention, embodiments thereof will now be described.

EMBODIMENTS

Figure 3:
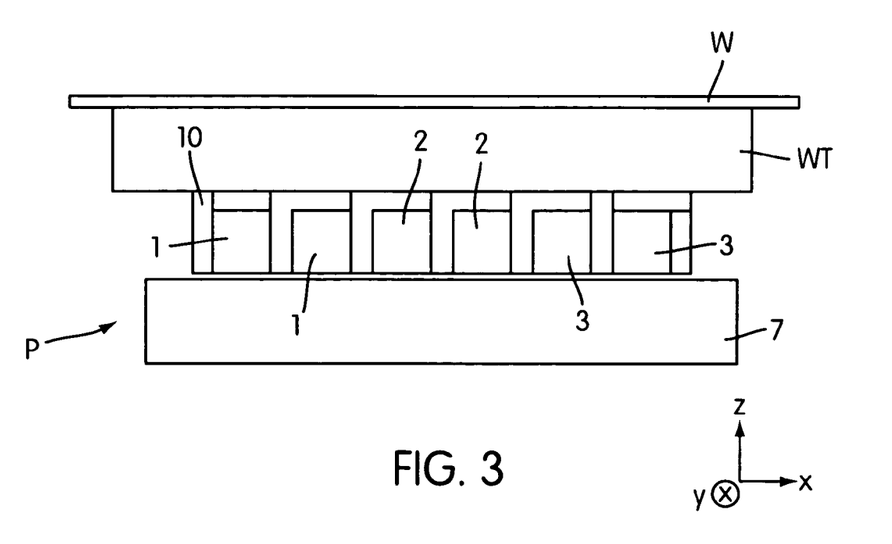
FIG. 3 depicts a cross section of the coil system for a displacement apparatus according to the present invention in the x-z plane.

FIG. 3 depicts a first part comprising coil system for a displacement apparatus according to the present invention. In particular, the displacement apparatus D comprises a first part 1, 2, 3 and a second part 7, which can be displaced with respect to each other in first and second different directions, wherein the first direction and the second direction lie in a plane. The first and second parts 1, 2, 3, 7 can be displaced in a further third different direction which lies at an angle to the plane. Preferably, the third different direction extends substantially perpendicular to the plane. Also, preferably, the first, second and third directions are the y, x and z directions, respectively, and extend substantially mutually perpendicular with respect to one another. The invention, however, is not limited with respect to the coordinate system in which it may have application.

The second part comprises a platen 7, may be mounted on the frame F of the lithographic apparatus. The first part comprises a first and second coil systems, each of which comprise a coil block 1, 2, 3. The coil block comprises winding disposed on a support. The first coil system includes at least a first winding arranged to have a longitudinal axis extending in the first direction. The second coil system includes at least a first winding arranged to have a longitudinal axis extending in the second direction. The coil block 1, 2, 3 is coupled to a substrate support WT on which a substrate W, is disposed in use.

The displacement apparatus D further comprises a power supply 8 which provides an alternating current (AC) power supply to the coils. A control mechanism may be provided to control the power supplied by the power supply 8. The platen 7 comprises a conductive material, preferably, a metal, such as copper, stainless steel, aluminum or titanium. Preferably, the platen is solid. However, since the only requirement of the platen is that it is conductive all metals and alloys may be used. When using ferromagnetic alloys, a repelling force will be difficult to realize. In a further embodiment, a ferromagnetic plate is provided, which is disposed in the x-y plane behind the conducting plate on a side of the conducting plate remote from the windings.

A controlled attractive force is generated. In such an embodiment, the platen 7 is disposed above the second moving part. Although, in FIG. 1, the displacement apparatus D is shown being used to position the wafer support with respect to the projection beam, the invention is not limited in this respect, and the displacement apparatus D of the present invention is suitable for various uses. For example, it may be used for positioning the mask support with respect to the projection beam. The invention has broader application to any manufacturing or packing processes requiring accurate positioning of one article with respect to a second article.

In the example shown, the coil system is depicted in the x-z plane. In particular, FIG. 3 shows that the coil system 1, 2, 3 comprises three coils, wherein each coil comprises current conductors. The coils 1, 2, 3 are preferably embedded in laminated iron sections 10. Embedding the coils in laminated iron improves the efficiency of the coils in terms of the current induced in the second part, platen 7. The coils are coupled to the substrate support WT. In the case that the substrate is a wafer W, as shown in FIG. 3, on which an integrated circuit is to be formed. The wafer table WT forms the substrate support.

The platen 7 is preferably mounted on the frame F of the lithographic apparatus. In this way it is held stationary. However, the invention is not limited in this respect. Either the first or the second part may be held stationary. The substrate which is to be positioned is coupled using coupling mechanism to the non-stationary part. The coils are disposed in close proximity to the upper surface in the z direction of the platen 7. In particular, the coils are placed as close as possible to this upper surface of the platen 7 without being in contact with it.

The platen 7 is disposed in a zone in which it is anticipated that the strongest magnetic field will be induced when a predetermined current is passed through the coils. Preferably, the platen will lie in a plane substantially parallel to the plane in which the current conductors of the coils lie. Preferably, the platen extends substantially in said first and second directions. Also, the first part is stationary with respect to said second part. Moreover, the second part is moveable with respect to said first part. Further, where the second part is the moveable part, it extends over a smaller area than said first part in said first and second directions. In the case where the first part is the moveable part, it is the first part which extends over a smaller area than the second part in the first and second directions.

In order to demonstrate the coil system's operating characteristics, as shown in Table 1 below, the current density through the coils 1, 2, 3 is varied according to equation (1). The amplitude of the current density is kept substantially constant and the frequency is increased through the range of 1 Hz to 10 kHz. In order to compare the operating characteristics of the displacement apparatus with respect to differing platen materials, Table 1 includes the operating characteristics for both a copper platen and a stainless steel platen.

As mentioned Table 1 sets out the results demonstrated by the coil system and platen as described above. In particular, the time averaged forces generated by the displacement apparatus of the present invention are given. As can be seen the coil system of FIG. 3 comprising current conductors extending longitudinally in the y direction, and lying in the x-y plane when operated at the current density mentioned above and at the frequencies given in the left hand column generated forces F in Newtons in the x and z direction.

TABLE I

| FREQUENCY | STAINLESS STEEL | | COPPER | |
|---|---|---|---|---|
| | Fx | Fz | Fx | Fz |
| 1 [Hz] | 4 | 0 | 117 | 32 |
| 3 | 12 | 0 | 225 | 139 |
| 10 | 38 | 3 | 230 | 315 |

TABLE I-continued

| FREQUENCY | STAINLESS STEEL | | COPPER | |
|---|---|---|---|---|
| | Fx | Fz | Fx | Fz |
| 30 | 102 | 24 | 144 | 426 |
| 100 | 220 | 129 | 46 | 516 |
| 300 | 240 | 291 | 6 | 596 |
| 1000 | 150 | 421 | 0 | 658 |
| 3000 | 58 | 504 | 0 | 691 |
| 10000 | 7 | 592 | — | — |

However, it will be understood that depending on the conditions applied forces can be generated to provide movement in 6 degrees of freedom. In order to control the six degrees of freedom independently, particular arrangement of the different coils systems is required. In each of the coil systems, amplitude, frequency and phase angle of the applied current are considered variable. By applying three coil systems, 6 variables are available.

It has been found that the phase difference between the magnetic field of the coil system and the magnetic field of the induced current generates a force vector that is directed between the first, second and third directions. In particular, the resulting force of a three phase coil system may be in a substantially horizontal direction, that is in a direction lying in the plane defined by the first and second directions, or alternatively in a direction which intersects at an angle the plane defined by the first and second directions. In one particular embodiment, the force may be directed in a substantially vertical direction, that is at a substantially 90 degree angle to the plane defined by the first and second directions.

To avoid dependencies between the different variables, the following constraints should be met when three coil systems are used:

- each of the coil systems should have a different orientation in the x y plane;
- none of the coil systems should have their force vector directed towards the center of gravity of the apparatus to be displaced.

Similarly, in case more than three coil systems are used it will be understood, that by suitably arranging coils in the same plane, yet extending longitudinally in two perpendicular directions, forces and torques can be generated in six degrees of freedom. Due to the coupling provided between the coil system and the substrate support, it will be understood that by varying the amplitude and frequency of the currents supplied to the coil system the displacement apparatus is able to determine with a high degree of accuracy the position of the substrate support.

FIG. 4 depicts the current distribution in a copper platen which is induced by the coil system shown in FIG. 3 operating a frequency of 100 Hertz. It is seen that high current distributions are induced in regions underlying the coil system. It is these current distributions which cause the forces discussed above and shown in Table 1 to be generated.

Figure 5:
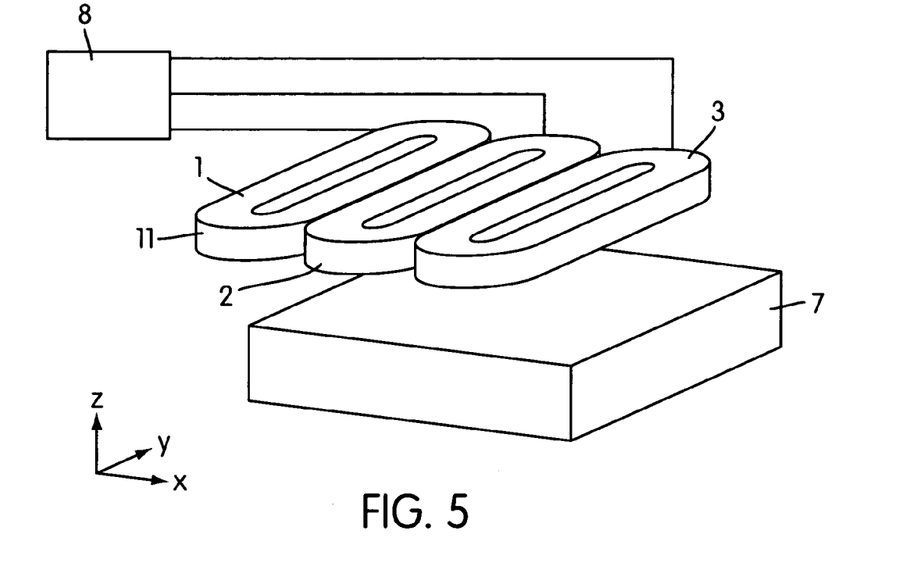
FIG. 5 depicts in three dimensions the coil system for a displacement apparatus of the present invention.

FIG. 5 depicts in three dimensions the coil system for a displacement apparatus of the present invention. In particular, FIG. 5 shows a platen 7 and a coil system lying in the x-y plane and extending longitudinally in the y direction. The coil system 1, 2, 3 is disposed in close proximity to said platen 7. A power supply 8 is provided which includes a power supply control device which, in accordance with a predetermined position profile, controls the power supply to provide an alternating current of the appropriate frequency and amplitude. The phase shift between coils of the same coil system (forcer) is a fixed number. In general, an N-phase system has a phase shift of 360/N degrees between the phase currents. The exception is in a two phase coil system, where there is a 90 degree shift.

FIG. 6 depicts a mover 60 comprising four forcers 10, 20, 30, 40, each comprising a three phase coil system in the x-y plane. The coil arrangement shown in FIG. 6 is comprised in the first part 1, 2, 3. The figure depicts four coil systems 10, 20, 30, 40, each comprising a three phase coil system 1, 2, 3, 21, 22, 23, 31, 32, 33, 41, 42, 43, respectively. The coils are arranged to each include a plurality of windings having a longitudinal axis extending along either the first direction or the second direction. In particular, in coil systems 10 and 40, the windings 1, 2, 3, 41, 42, 43 have a longitudinal axis extending in the first direction, whereas in coils systems 20, 30, the windings 21, 22, 23, 31, 32, 33 have a longitudinal axis extending in the second direction.

The first direction is shown in the figure as being preferably the y direction and the second direction is preferably the x direction. All windings are disposed in the x-y plane. Such a coil arrangement may be referred to as a "mover". Further, a coil system comprising a three phase coil system may also be referred to as a "forcer".

FIG. 7 depicts a mover 80 comprising three forcers 50, 60, 70 each comprising a three phase coil system in the x-y plane. The coil arrangement shown in FIG. 7 is an alternative to that shown in FIG. 6 and is comprised in the first part 1, 2, 3. The figure depicts three coil systems 50, 60, 70, each comprising a three phase coil system, respectively. The coil systems 50, 60, 70 are substantially disposed in the same plane, in the x-y plane, however, some overlap of coil systems is permitted. The coil systems 50, 60, 70 include a plurality of windings.

A first coil system 50 includes a plurality of windings having a longitudinal axis 54 extending in a first direction, the y direction. The second coil system 60 includes a plurality of windings having a longitudinal axis extending in a second direction 64 lying substantially in the x-y plane. The third coil system includes a plurality of windings having a longitudinal axis extending in a third direction 74 lying substantially in the x-y plane. The angle between longitudinal axes of the first, second and third coil systems is preferably of the order of 120 degrees. It will be appreciated that while the preferred angle between coil systems is approximately 120 degrees, the invention is not limited in this respect and variations with respect to the angle of the intersection of the longitudinal axes of the coil systems are permitted.

In addition, the displacement apparatus further comprises a coupling for coupling the first part to a substrate of a lithographic apparatus, so as to couple the displacement provided by the displacement apparatus to the substrate. Further, either the second part of the first part is preferably held stationary with respect to the other part, and the other part is not held stationary. The coupling mechanism is arranged to engage with the non-stationary part. Preferably, the platen 7 extends in a plane substantially parallel to the plane defined by the first and second directions. Preferably, the second part extends over a smaller area than the first part.

While specific embodiments of the invention have been described above, it will be appreciated that the invention may be practiced otherwise than as described. As such, the description is not intended to limit the invention. The configuration, operation, and behavior of the present invention has been described with the understanding that modifications and variations of the embodiments are possible, given the level of detail present herein. Thus, the preceding detailed description is not meant or intended to, in any way, limit the invention—rather the scope of the invention is defined by the appended claims.

What is claimed is:

1. A displacement apparatus, comprising:
    a first part comprising a first coil system that includes a first plurality of windings having a longitudinal axis extending along a first direction and a second coil system that includes a second plurality of windings having a longitudinal axis extending along a second direction, wherein said first and second directions lie in a plane and said first and second plurality of windings configured to respectively carry a current;
    a second part comprising a conductive platen disposed in a vicinity of said first part in a zone in which said first and second coil systems induce a magnetic field in said platen based on the currents carried by said first and second plurality of windings; and
    an alternating current supply configured to supply a multi-phase alternating current to said first and second coil systems,
    wherein a phase difference between the magnetic field of said first and second plurality of windings and the magnetic field induced in said platen subjects said first and second parts to a force resulting in said first and second parts being displaceable relative to one another along said second and first directions, respectively, and in a third direction that is at an angle to said plane.

2. The displacement apparatus of claim 1, wherein said third direction extends substantially perpendicular to said plane.

3. The displacement apparatus of claim 1, wherein said platen comprises a non-magnetic material.

4. The displacement apparatus of claim 1, wherein said platen comprises a copper, stainless steel, titanium, or aluminum material.

5. The displacement apparatus of claim 1, wherein said platen is solid.

6. The displacement apparatus of claim 1, wherein said first, second, and third directions are x, y, z directions, respectively, wherein said directions are arranged to be substantially mutually perpendicular to one another.

7. The displacement apparatus of claim 1, further comprising a displacement control mechanism for controlling the displacement of the first and second parts with respect to one another, wherein said control mechanism controls the alternating current supplied to said first and second coil systems.

8. The displacement apparatus of claim 7, wherein said control mechanism controls the frequency of the alternating current to provide a predetermined displacement.

9. The displacement apparatus of claim 7, wherein said control mechanism controls the amplitude of the alternating current to provide a predetermined displacement.

10. The displacement apparatus of claim 7, wherein said control mechanism controls the phase of the alternating current to provide a predetermined displacement.

11. The displacement apparatus of claim 1, wherein said platen extends substantially in said first and second directions.

12. A method of displacing a first part relative to a second part of an apparatus, wherein a first coil system includes a first plurality of windings having a longitudinal axis extending in a first direction, said first plurality of windings configured to carry a current; a second coil system includes a second plurality of windings having a longitudinal axis extending in a second direction, said second plurality of windings configured to carry a current and wherein said first and second directions lie in a plane; said second part having a conductive platen positioned in a vicinity of said first part in a zone in which said first and second coil systems induce a magnetic field in said platen based on the currents carried by said first and second plurality of windings, said method comprising:
supplying a multi-phase alternating current to said first and second coil systems,
wherein a phase difference between the magnetic field of said first and second plurality of windings and the magnetic field induced in said platen subjects said first and second parts to a force relative to each other along said second and first directions, respectively, and in a third direction that is at an angle to said plane.

13. A lithographic apparatus, comprising:
an illumination system configured to condition a beam of radiation;
a support configured to support a patterning device that imparts a desired pattern to the beam of radiation;
a substrate holder configured to hold a substrate;
a projection system configured to project the patterned beam onto a target portion of the substrate; and
a displacement apparatus for displacing said substrate table and said patterned beam relative to each another, said displacement apparatus comprising:
 a first part comprising a first coil system that includes a first plurality of windings having a longitudinal axis extending along a first direction and a second coil system that includes a second plurality of windings having a longitudinal axis extending along a second direction, wherein said first and second directions lie in a plane and said first and second plurality of windings configured to respectively carry a current;
 a second part comprising a conductive platen disposed in a vicinity of said first part in a zone in which said first and second coil systems induce a magnetic field in said platen based on the currents carried by said first and second plurality of windings; and
 an alternating current supply configured to supply a multi-phase alternating current to said first and second coil systems,
wherein a phase difference between the magnetic field of said first and second plurality of windings and the magnetic field induced in said platen subjects said first and second parts to a force relative to each other along said second and first directions, respectively, and in a third direction that is at an angle to said plane.

14. A device manufacturing method comprising:
projecting a patterned beam of radiation onto a substrate; and
providing a displacement apparatus configured to displace said substrate with respect to said patterned beam by:
 providing a first coil system that includes a first plurality of windings having a longitudinal axis extending in a first direction, said first plurality of windings configured to carry a current;
 providing a second coil system that includes a second plurality of windings having a longitudinal axis extending in a second direction, said second plurality of windings configured to carry a current and wherein said first and second directions lie in a plane;
 providing said second part with a conductive platen;
 positioning said platen in a vicinity of said first part in a zone in which said first and second coil systems induce a magnetic field in said platen based on the currents carried by said first and second plurality of windings;
 supplying a multi-phase alternating current to said first and second coil systems, wherein a phase difference between the magnetic field of said first and second plurality of windings and the magnetic field induced in said platen subjects said first and second parts to a force relative to each other along said second and first directions, respectively, and in a third direction that is at an angle to said plane; and
 coupling said displacement apparatus to said substrate.

15. A lithographic apparatus, comprising:
an illumination system configured to condition a beam of radiation;
a support configured to support a patterning device that imparts a desired pattern to the beam of radiation;
a substrate holder configured to hold a substrate;
a projection system configured to project the patterned beam onto a target portion of the substrate; and
a displacement apparatus configured to displace said displace said support structure relative to said beam of radiation, said displacement apparatus comprising:
 a first part comprising a first coil system that includes a first plurality of windings having a longitudinal axis extending along a first direction and a second coil system that includes a second plurality of windings having a longitudinal axis extending along a second direction, wherein said first and second directions lie in a plane and said first and second plurality of windings configured to respectively carry a current;
 a second part comprising a conductive platen disposed in a vicinity of said first part in a zone in which said first and second coil systems induce a magnetic field in said platen based on the currents carried by said first and second plurality of windings; and
 an alternating current supply configured to supply a multi-phase alternating current to said first and second coil systems,
wherein a phase difference between the magnetic field of said first and second plurality of windings and the magnetic field induced in said platen subjects said first and second parts to a force relative to each other along said second and first directions, respectively, and in a third direction that is at an angle to said plane; and
a coupling mechanism configured to couple said displacement apparatus to said support structure.

* * * * *